United States Patent [19]
Berger

[11] 3,787,756
[45] Jan. 22, 1974

[54] INRUSH CURRENT LIMITING CIRCUIT

[75] Inventor: James K. Berger, Sherman Oaks, Calif.

[73] Assignee: Pioneer Magnetics, Inc., Santa Monica, Calif.

[22] Filed: Jan. 19, 1973

[21] Appl. No.: 324,959

[52] U.S. Cl. .................... 321/11, 321/18, 321/45 S
[51] Int. Cl. .......................................... H02m 1/18
[58] Field of Search..... 321/11, 13, 14, 18, 45 S, 47

[56] References Cited
UNITED STATES PATENTS

| | | | |
|---|---|---|---|
| 3,227,940 | 1/1966 | Gilbert et al. | 321/18 X |
| 3,363,143 | 1/1968 | Cavanaugh | 323/24 |
| 3,461,375 | 8/1969 | Nestler et al. | 321/47 X |
| 3,506,907 | 4/1970 | Porterfield et al. | 321/45 S |
| 3,693,047 | 9/1972 | Hamstra | 321/13 |
| 3,678,368 | 7/1972 | Popp | 321/14 X |
| 3,699,399 | 10/1972 | Barber | 321/47 X |

Primary Examiner—William M. Shoop, Jr.
Attorney, Agent, or Firm—Keith D. Beecher

[57] ABSTRACT

An inrush current limiting circuit is provided for use with transistorized high voltage power supplies to permit such power supplies to use capacitor input filters. The inrush current limiting circuit of the invention prevents the creation of a large inrush charging current to the capacitor input filter when the power supply is first energized, and which would otherwise be liable to cause damage to switches and relays in the power supply. The current limiting circuit to be described includes one or more silicon controlled rectifiers in series with the input of the filter, and it also includes a control circuit connected to the silicon controlled rectifiers and to the capacitor input filters. The control circuit serves to control the firing point of the silicon controlled rectifiers relative to successive half cycles of the rectified alternating current input when the power supply is first turned on, so as to cause the silicon controlled rectifier to fire at different points during each successive half cycle. This control serves to maintain the current flow into the filter at an acceptable level at all times.

9 Claims, 6 Drawing Figures

INRUSH CURRENT LIMITING CIRCUIT

BACKGROUND OF THE INVENTION

In recent years the availability of transistors suitable for high voltage, high power switching has made feasible the design of power supplies which operate by rectifying the input alternating current voltage directly, and then filtering the rectified voltage to produce a high direct current voltage; and then by means of transistors or silicon controlled rectifiers (SCR's) to generate a high frequency alternating current voltage which can be transformed and isolated using a transformer much smaller, lighter and less expensive than would be required for direct 60 cycle operation.

A further advantage of the aforesaid form of power conversion circuit is that energy can be stored in the high voltage direct current filter capacitors of the circuit so as to enable the power supply to maintain output power during short interruptions of input power.

It is desirable to use a capacitor input filter in the above described type of high voltage direct current conversion circuit. This is because the use of choke coil input filter would negate much of the advantage of the direct rectification technique. This is because the choke coil would operate at 60 cycles and would be nearly as expensive and heavy and bulky as the usual 60 cycle power transformer.

In addition, a choke coil input filter requires a minimum load to maintain the current in the choke coil above the critical current level. Also, the output voltage from a choke coil input filter is less than that of a capacitor input filter operating from the same alternating current input, and the lower voltage is less desirable for the aforesaid conversion purposes.

The use of the preferable capacitor input filter in the aforesaid type of high voltage direct current conversion circuit, however, presents one serious problem. That is, when the input voltage is first applied to the circuit, the capacitor, or capacitors, in the input filter must be charged rapidly. The extremely large inrush current required to charge the filter capacitors may be of the order of 50-100 times greater than the normal operating current. This large current surge is usually sufficient to damage mechanical switches or relays used to turn the power supply on and off, and to damage the power supply rectifiers. An important objective of the present invention is to provide feasible circuitry which serves to limit the inrush current to a safe value, and yet to permit the filter capacitors to charge up within a reasonable time.

One means of controlling the inrush current in accordance with the concepts of the invention is to provide one or more silicon controlled rectifiers (SCR's) in series with the input to the filter, and to advance the firing angle of the SCR relative to the alternating current input when input power is applied. The firing angle typically is displaced 180° in each half cycle of the rectified applied power, and it proceeds to approximately 60° at a rate which charges the filter capacitor slowly enough to prevent excessive current flow.

DETAILED DESCRIPTION OF THE ILLUSTRATED EMBODIMENTS

Figure 1:
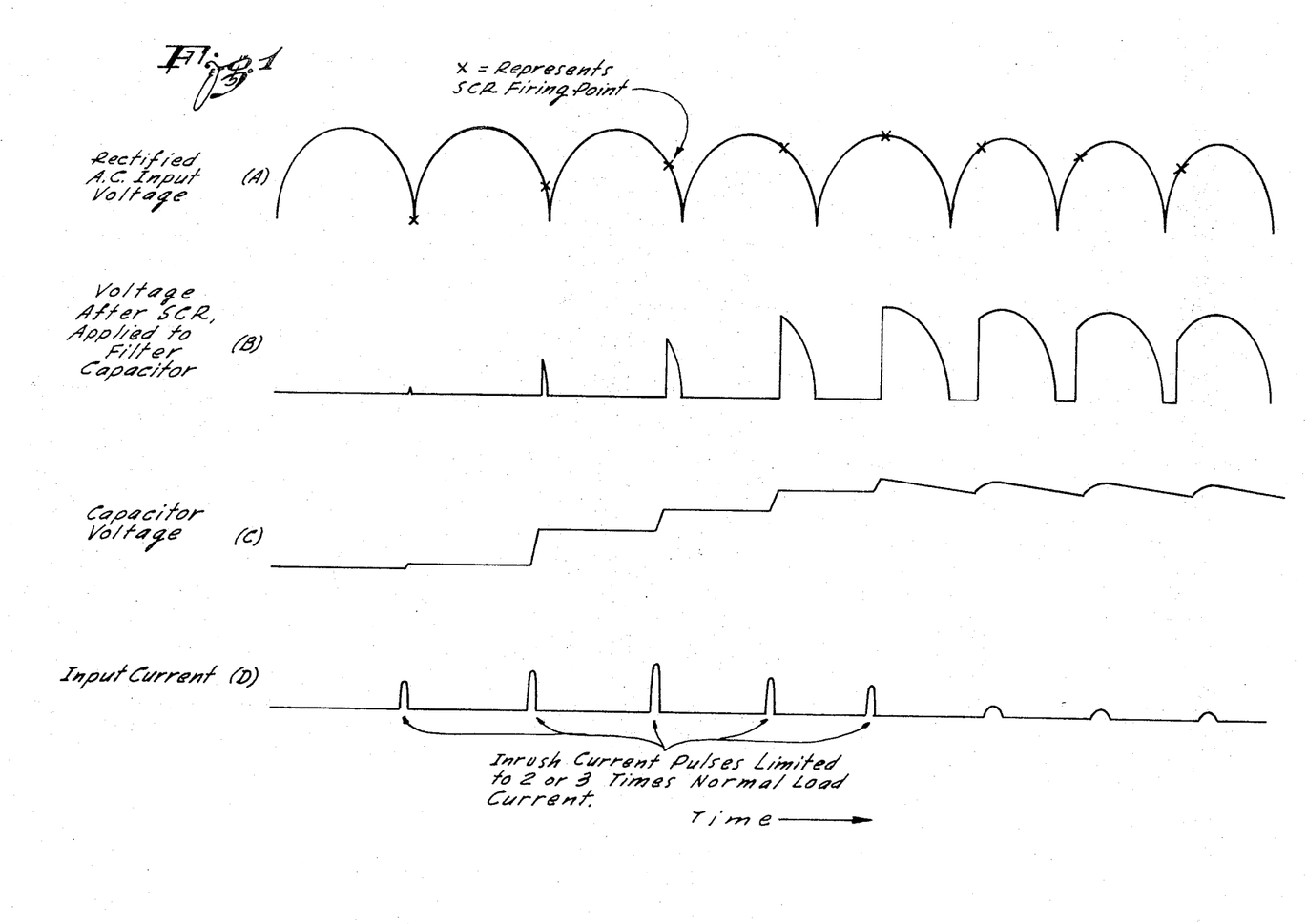
FIG. 1 is a series of wave forms ilustrating the operation of the current limiting circuit of the invention.

The control of the inrush current in the practice of the invention is illustrated graphically by the wave forms of FIG. 1. For descriptive purposes, the control is illustrated in FIG. 1 as extending over approximately four cycles of input voltage. However, in actual practice, the control will usually extend over, for example, about 30 cycles of input voltage. As shown in FIG. 1, the input alternating current voltage is rectified so that it has a pulsing form shown by the wave form A corresponding to successive half cycles of the input voltage. The firing point of the silicon controlled rectifiers for each half cycle is represented by X. It will be seen that for the first half cycle the firing point is displaced 180°, and then for succeeding half cycles it returns towards the maximum 90° position, and actually passes that position to assume a 60° position for normal operation of the system.

The aforesaid control of the firing point of the silicon controlled rectifier causes initially a small voltage to be applied to the filter capacitor, as shown by the curve B, and this voltage increases as the filter capacitor assumes its charge, as represented by the curve C. The net result of the action of the circuit as shown in the curve D is to limit the inrush current to the filter capacitor to a level of about two or three times the normal load current, instead of 50 to 100 times as would otherwise occur.

Figure 2:
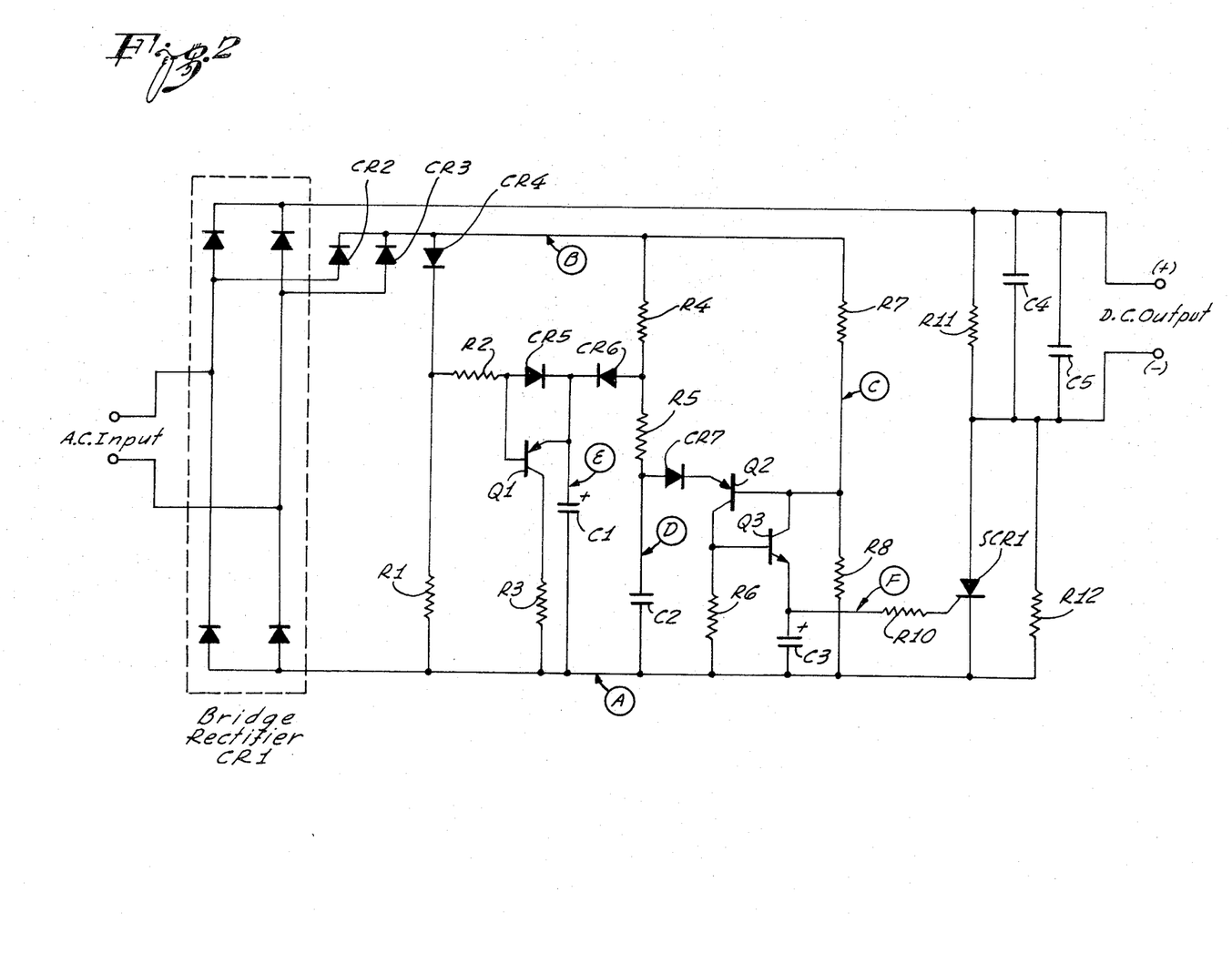
FIG. 2 is a circuit diagram of one embodiment of the invention in which a single silicon controlled rectifier (SCR) is used to limit the inrush current.

The circuit of FIG. 2 is representative of one embodiment of the invention using a single silicon controlled rectifier (SCR) to accomplish inrush current limiting. In the circuit of FIG. 2, the element CR1 is a bridge rectifier which rectifies the input alternating current voltage directly. The input alternating current voltage may be a 60 cycle 117 volts AC. The element CR1 may be a packaged bridge rectifier element of the type designated 1N4436. The direct current power filter capacitors are C4 and C5, each of which may be 3,000 microfarads, 200 volts. Since the capacitors C4 and C5 are connected in parallel, the total capacitance in the illustrated circuit is 6,000 microfarads. The cathode side of the bridge rectifier CR1 is directly connected to the positive side of the filter capacitors C4 and C5.

The anode side of the bridge rectifier CR1 is connected to the negative side of the filter capacitors C4 and C5 through a silicon controlled rectifier SCR1, such that the return current passes from the capacitor C4 and C5 through the silicon controlled rectifiers SCR1 to the bridge rectifier CR1 only if the silicon controlled rectifier SCR1 is in its conductive state.

A resistor R11, which may be 10 kilo-ohms, 5 watts, serves to discharge the capacitors C4 and C5 when input power is removed, so as to prevent the retention of a dangerous charge on the capacitors C4 and C5 during the times of service, repairs or other occasions.

Figure 3:
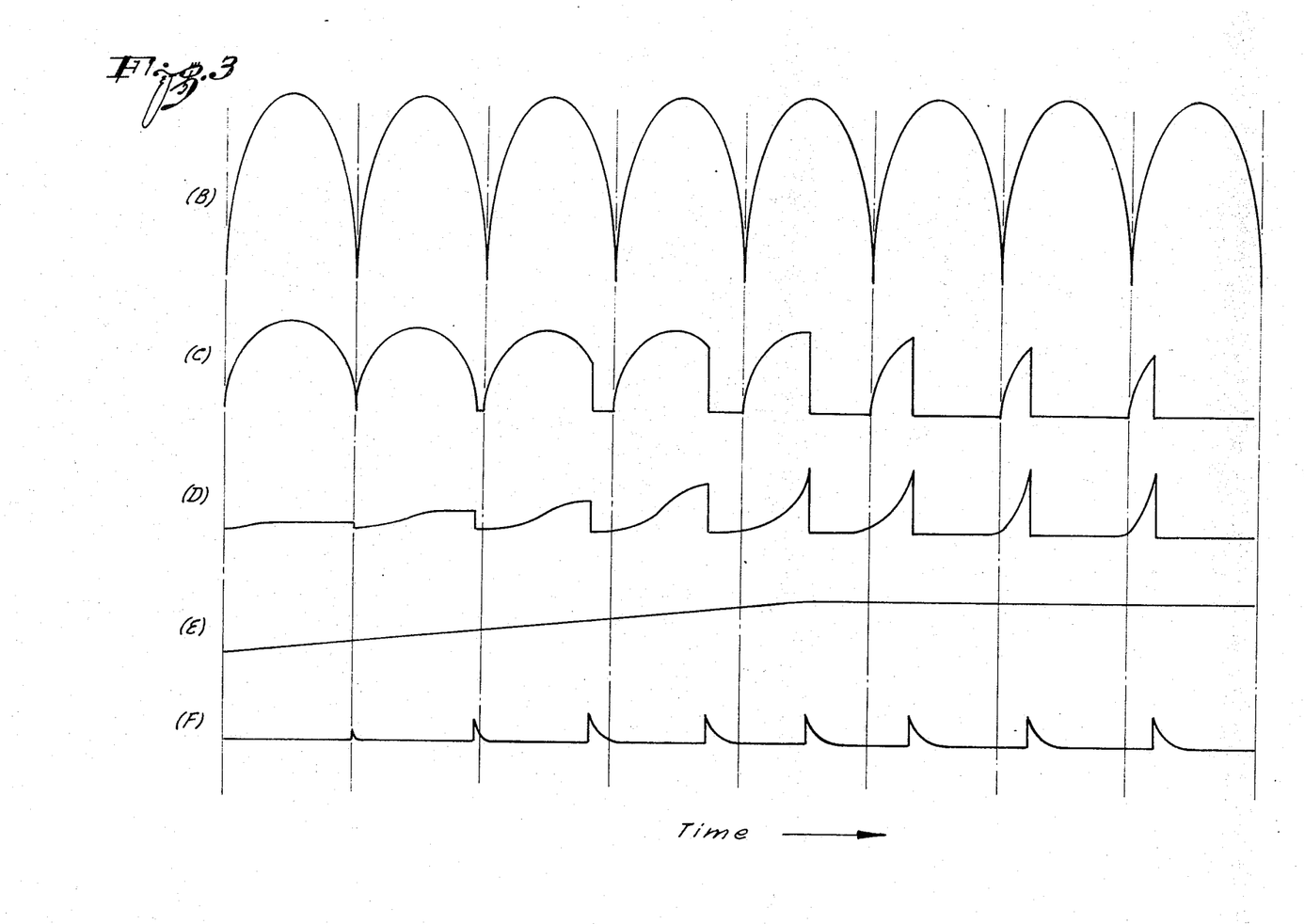
FIG. 3 is a series of wave forms showing the operation of the circuit of FIG. 2.

The remaining circuit elements serve to control the firing angle of the silicon controlled rectifier SCR1. These elements operate as follows: Referring to both FIG. 2 and the wave forms of FIG. 3, and considering the point A to be the reference, diodes CR2 and CR3 and the lower two diodes of the bridge rectifier CR1, form a bridge rectifier which rectifies the input alternating current voltage to produce a full wave rectified voltage at point B. The resistors R7 and R8 form a voltage divider which generates a voltage at point C which, as shown in FIG. 3, is the same as at point B during the first portion of each half cycle (but of smaller amplitude), until the circuit of transistors Q2 and Q3 is turned on. The resistor R7 may be 6 kilo-ohms, and the resistor R8 may be 470 ohms.

The resistors R4 and R5, and capacitors C2 form an integrating network such that the voltage at point D increases after the zero amplitude of the point B until the voltage at D exceeds that at C, at which time the circuit of the transistors Q2 and Q3 is rendered conductive. The rate at which the voltage at point D increases is controlled by the current through the diode CR6, because current which flows through the resistor R4 charges the capacitor C2 and current which passes through CR6 is subtracted from this charging current.

If the voltage at point E is low, the current flowing through the resistor R4 will pass mostly through the diode CR6, leaving only a small current to charge the capacitor C2. If the voltage at point E is relatively high, on the other hand, less current will pass through the diode CR6, and more curent will charge the capacitor C2. When the circuit of transistors Q2 and Q3 is turned on, the capacitor C2 is discharged. The resistor R4 may be 13 kilo-ohms, the resistor R5 may be 2.2 ohms, the capacitor C2 may be 1 microfarad, and the diode CR6 may be of the type 1N4148.

The circuits formed by the transistors Q2 and Q3 function in the following manner: When the voltage at point D exceeds that of point C, the diode CR7 becomes conductive and the base-emitter junction of the transistor Q2 becomes forward biased and conductive. Collector current then flows from the transistor Q2 into the resistor R6 and into the base of the transistor Q3. This current flow causes the transistor Q3 to become conductive, and current flows from point C into the collector of the transistor Q3. This latter current flow further reduces the voltage at the point C, causing an increase in the current through the diode CR7 and through the base of the transistor Q2. This action is regenerative, and it results in a large current flow from point D through the diode CR7, and through the transistors Q2 and Q3 into the capacitor C3.

The aforesaid current rapidly discharges the capacitor C2 and charges the capacitor C3. A resistor R6 serves to conduct leakage current from the collector of the transistor Q2 to the reference point A so as to prevent undesired premature turn-on of the transistor Q3. The diode CR7 may be of the type desiganted 1N4148, the transistor Q2 may be of the type designated 2N4248, the transistor Q3 may be of the type designated 2N5172, the resistor R6 may be 2.2 kilo-ohms and the capacitor C3 may be 0.33 microfarads.

When the capacitor C3 is charged, a positive voltage is applied to the gate of the silicon controlled rectifier SCR1 through the resistor R10, causing the silicon controlled rectifier SCR1 to become conductive. The resistor R9 then discharges the capacitor C3 in preparation for the next half cycle. The resistor R10 may be 82 ohms, and resistor R9 may be 220 ohms. The silicon controlled rectifier SCR1 may be of the type designated 2N3669.

It can be seen in FIG. 3 that as the voltage of the point E increases, the voltage at point D increases more rapidly during each half cycle so that the trigger pulse at point F occurs earlier in each half cycle than in the previous half cycle. If the voltage at point E starts at zero and is allowed to increase at a controlled rate, the silicon controlled rectifier SCR1 will conduct first when the rectified input voltage is at a low amplitude point in the half cycle, and then at higher and higher voltages until it conducts during the entire peak of the input sinusoidal wave. In this manner, the capacitors C4 and C5 are charged gradually, rather than suddenly, and the inrush current is controlled to acceptable amplitudes.

The voltage at point E is developed across capacitor C1, which may be 50 microfarads. The capacitor C1 is charged partly by current through the diode CR6, and partly by current through a diode CR4, resistor R2 and diode CR5. The diodes CR4 and CR5 may be of the type designated 1N4148, and resistor R2 may be 47 kilo-ohms.

The capacitor C1 is discharged through the transistor Q1 and resistor R3 when the voltage at point B is less than the voltage at point E. When the voltage at point B is less than the voltage at point E, the diode CR4 becomes reverse biased and the base-emitter junction of the transistor Q1 becomes forward biased and conductive.

When the transistor Q1 becomes conductive, current flows from the base of the transistor Q1 through resistors R2 and R1 to the reference point A, and from the collector of the transistor Q1 through resistor R3 to reference point A. When that occurs, diode CR4 becomes reverse biased so that current cannot flow from the junction of the resistors R1 and R2 back through resistors R7 and R8, which would otherwise prevent point C from approaching zero volts between half cycles. The resistor R1 may be 33 kilo-ohms, and resistor R3 may be 1 kilo-ohm.

In the steady-state condition after the input has been applied for many cycles, the following equilibrium conditions are established. When the voltage at point E is low, the discharge current is less than the charge current. This is because only a small current can flow through the resistor R3 due to the small voltage applied across that resistor. As the voltage at point E increases, the discharge current increases, and the charge current through the diode CR6 decreases. The voltage at point E will reach an equilibrum when the charge and discharge currents are equal. At that point, the current through the diode CR6 is low, and the capacitor C2 charges rapidly so as to cause the trigger point of the silicon controlled rectifier SCR1 to occur at, for example, 60° of the input half cycle.

When the input alternating current voltage is removed, the transistor Q1 conducts continuously until the capacitor C1 is discharged. The values of the resistors R4, R3, R2, R1 and of the capacitor C1 are chosen such that capacitor C1 will charge from zero volts to the equilibrium voltage in, for example 30 cycles of input voltage, and will discharge within the equivalent of a few cycles time after the input has been removed.

If the capacitor C1 were to be discharged by a resistor alone, instead of by the transistor Q1 and resistor R3, the discharge time constant would be nearly equal to charge time constant; and if the input alternating current voltage were turned off for fewer than, for example, 30 cycles of input voltage, the capacitor C1 would not fully discharge, and the inrush current limiting circuit would therefore not be fully reset, even though the filter capacitors C4 and C5 might be fully discharged. In such a case, a large inrush current could be reduced by repeatedly actuating the on-off switch of the unit or by a rapid on-off cycling, caused, for example, by relay or switch contact bounce.

The effect of the transistor Q1 is to switch or the discharge current only when the input alternating current is off, or near a zero crossing. Since the discharge current is then effective for only a small part of each cycle, resistor R3 may be chosen to provide a relatively large discharge current, so that capacitor C1 may be discharged as rapidly as the filter capacitors C4 and C5 when the alternating current input voltage is turned off. The circuit of the transistor Q1 prevents the capacitor C4 and C5 from discharging faster than the inrush current limiting circuit can be reset.

If the silicon controlled rectifier SCR1 is triggered very late in a cycle, and if the capacitors C4 and C5 are completely discharged, the silicon controlled rectifier SCR1 may not have sufficient time to turn off at the zero crossing, and it may be conductive for the entire succeeding half cycle. The resistor R12 is connected across the silicon controlled rectifier to prevent such a happening. During the first half cycle of the applied alternating current input voltage, sufficient current flows through the resistor R12 to charge the capacitors C4 and C5 to a sufficiently high voltage to prevent the silicon controlled rectifier SCR1 from conducting through the notch. The resistor R12 may be of the order of 15 ohms.

Figure 4:
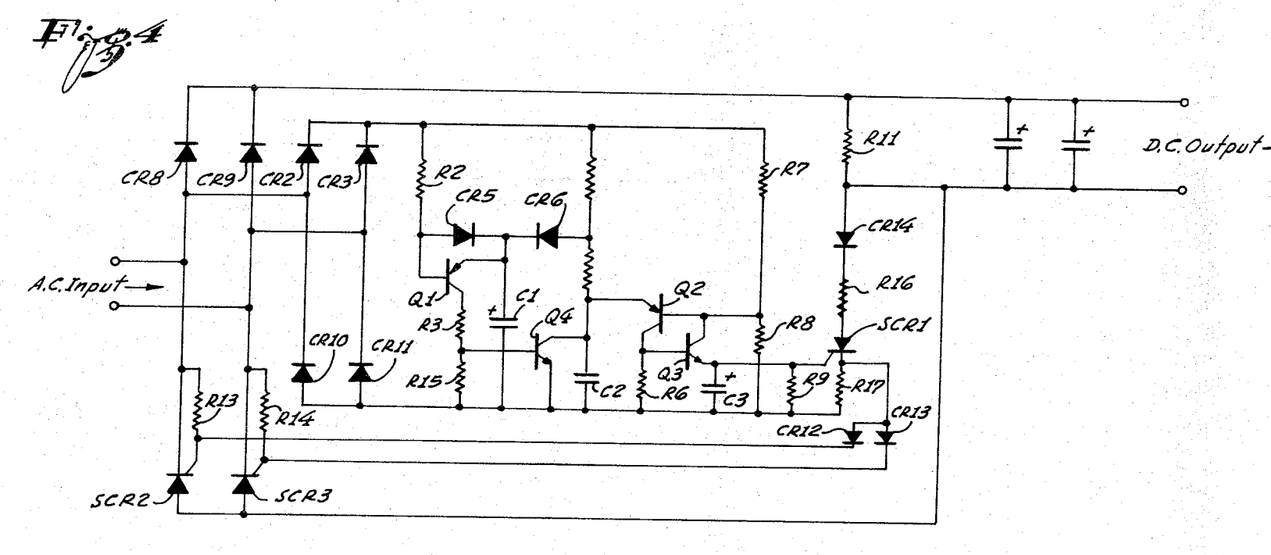
FIG. 4 is a circuit diagram of a second embodiment of the invention in which two silicon controlled rectifiers (SCR) are used to limit the inrush current.

The inrush current limiting circuit illustrated in FIG. 4 uses two silicon controlled rectifiers (SCR2 and SCR3) and the latter circuit is suitable for higher power than the single silicon controlled rectifier circuit of FIG. 2. This is because the load current in the circuit of FIG. 4 passes through the two silicon controlled rectifiers SCR1 and SCR2 alternately, instead of continuously through a single silicon controlled rectifier, as is the case with the preceding circuit. Common circuit elements in the circuits of FIGS. 2 and 4 have been designated by the same numbers.

The operation of the circuit of FIG. 4 is the same as that of the single silicon controlled rectifier circuit of FIG. 1, except that the trigger pulse is applied to a small pilot silicon controlled rectifier SCR1, which in turn supplies a large trigger pulse to one of the two larger silicon controlled rectifiers SCR2 and SCR3, according to which of the two is conditioned next to conduct.

In the circuit of FIG. 2, the control circuit and the power circuit share the lower two diodes of the bridge CR1. In the circuit of FIG. 4, on the other hand, the control is separated from the power. Diodes CR10 and CR11 are provided for the control circuit, and the silicon controlled rectifiers SCR2 and SCR3 are provided for the power rectifiers.

When the pilot silicon controlled rectifier SCR1 is triggered into its conductive state, current flows from the filter capacitors CR4 and CR5 through diode CR14, through resistor R16, through silicon controlled rectifier SCR1, and through diode CR12 or diode CR13, into the gate of the silicon controlled rectifier SCR2 or SCR3, causing one or the other of the latter two silicon controlled rectifiers to be switched to its conductive state.

At the time the silicon controlled rectifier SCR1 is triggered, one of the input terminals, and hence the cathode of one of the silicon controlled rectifiers SCR2 or SCR3 is more negative than the other, depending upon which half cycle is then occurring. The voltage on the more positive cathode will be transmitted through resistor R13 or resistor R14 to the cathode of a diode CR12 or CR13, causing that diode to be reverse biased. Therefore, only the diode CR12 or CR13 which is connected to the more negative power silicon controlled rectifier SCR2 or SCR3 will conduct, and only that silicon controlled rectifier will be triggered. In this way, the power silicon controlled rectifiers SCR2 and SCR3 conduct on alternate half cycles.

Resistors R13 and R14 also serve to by-pass leakage currents around the gate-cathode junctions of the power silicon controlled rectifiers SCR2 and SCR3 so that these silicon controlled rectifiers will not be spuriously triggered. Resistor R16 seves to limit the current that can flow in the small pilot silicon controlled rectifier SCR1. Diode CR14 prevents the pilot silicon controlled rectifier SCR1 from having reverse anode voltage applied simultaneously with the trigger pulse, if the trigger pulse occurs earlier in the half cycle than the anode voltage, as would be the case after the inrush limiter reaches equilibrium.

The diode CR4 of FIG. 2 is eliminated in the cirucit of FIG. 4 and it is replaced by the transistor Q4. The transistor Q4 discharges the capacitor C2 completely during the notch period, making it unnecessary for the junction of resistors R7 and R8 (point C of FIG. 2) to approach zero volts during that period.

In the circuit of FIG. 4, the following values may be used:

Q1 = 2N2907; Q2 = 2N2907; Q3 = 2N2222; Q4 = 2N2222; SCR1 = ID301; SCR2 = 2N3898; SCR3 = 2N3898; R2 = 200 kilo-ohms; R3 = 3.3 kilo-ohms; R4 = 47 kilo-ohms; R5 = 10 kilo-ohms; R6 = 10 kilo-ohms; R7 = 47 kilo-ohms; R8 = 3.3 kilo-ohms; R9 = 3.3 kilo-ohms; R11 = 10 kilo-ohms; R13 = 100 ohms; R14 = 100 ohms; R15 = 3.3 kilo-ohms; R16 = 10 ohms; C1 = 47 microfarads; C2 = 0.22 microfarads; C3 = 0.22 microfarads; C4 = 1,500 microfarads; C5 = 1,500 microfarads; CR2 = 54M; CR3 = 54M; CR5 = 1N4148; CR6 = 1N4148; CR7 = 1N4148; CR8 = 1N1188; CR9 = 1N1188; CR10 = 54M; CR11 = 54M; CR12 = 54M; CR13 = 54M.

Problems may arise in the circuits of FIGS. 2 and 4 when the input alternating current source has a resonant circuit whose resonant frequency is higher than the supply frequency. For example, if a 60 cycle alternating current supply source has a resonance at 10 KHz, the inrush limiting current circuits of FIGS. 2 and 4 may not operate properly. Such a situation may arise, for example, if the power supply containing the inrush limiting circuit 98 (FIG. 5)is connected through 5) is radio frequency interference filter 100 to the main power source.

Figure 5:
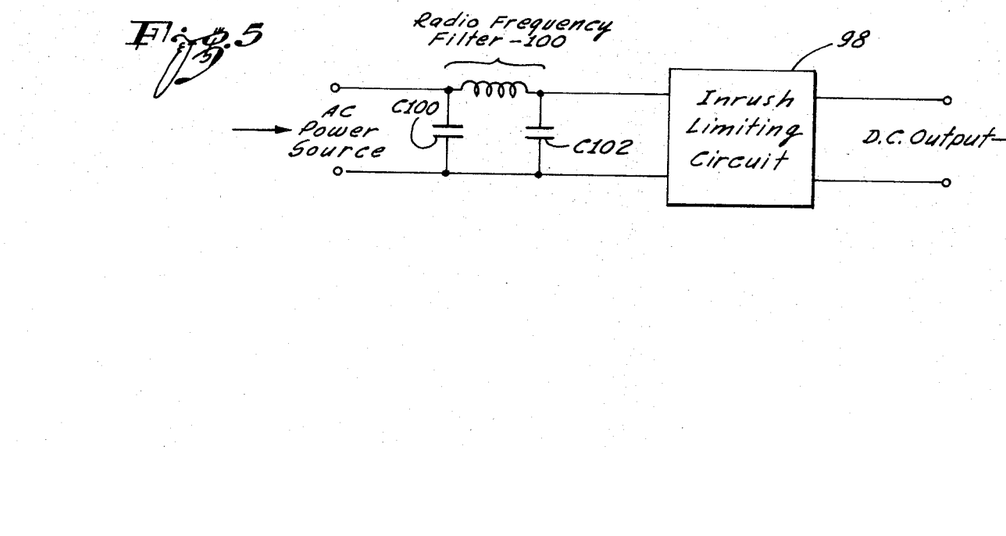
FIG. 5 is a diagramatic representation of the inrush current limiting circuits, such as shown in FIGS. 2 and 4, connected through a radio frequency interference filter to an alternating current source.

The filter 100 may include, for example, a pair of 100 microfarad capacitors C100 and C102 and a 15 microhenry series choke coil L100.

The reason for the difficulty is that when the power silicon controlled rectifier is triggered and becomes conductive, a sudden current is drawn from the resonant source, causing a decaying oscillation of the source at a frequency higher than the supply frequency. This oscillation causes a current reversal in the power silicon controlled rectifier, which in turn causes the silicon controlled rectifier to switch to the blocking state for the remainder of the input alternating current half cycle. Because the power silicon controlled rectifier is thus turned off immediately after turning on, the filter capacitors never become charged. Further, the amplitude of the oscillation induced in the source circuit may be sufficient to damage other semiconductors in the inrush limiting circuit.

To overcome the difficulty, it is necessary to supply a continuous trigger to the silicon controlled rectifier, instead of a trigger pulse. This assures that the silicon controlled rectifier cannot be turned off and remain off. Then, although the source circuit can still cause reversal of the current in the silicon controlled rectifier, the silicon controlled rectifier will again conduct because the gate trigger is still present when current again flows in the normal direction. This action damps the oscillation after the first high frequency half cycle, and permits the silicon controlled rectifier to remain conductive thereafter, until the notch.

It is not sufficient, however, simply to extend the trigger duration to greater than the length of the longest anticipated high frequncy resonant half cycle. If this were done, the trigger would overlap the notch period when the trigger occurs late in the half cycle, causing the silicon controlled rectifier to remain conductive throughout the entire next half cycle.

To avoid the aforesaid difficulty, it is possible to supply two separate trigger signals, one for each of two power silicon controlled rectifiers. If one power silicon controlled rectifier is connected to conduct for one half cycle, and if the other power silicon controlled rectifier is connected to conduct for alternate half cycles, as in the circuit of FIG. 4, then when separate trigger signals are used, these separate trigger signals can be extended and overlap the notch period without causing undesired conduction of the associated silicon controlled rectifier. A circuit which accomplishes this objective is illustrated in FIG. 6.

Figure 6:
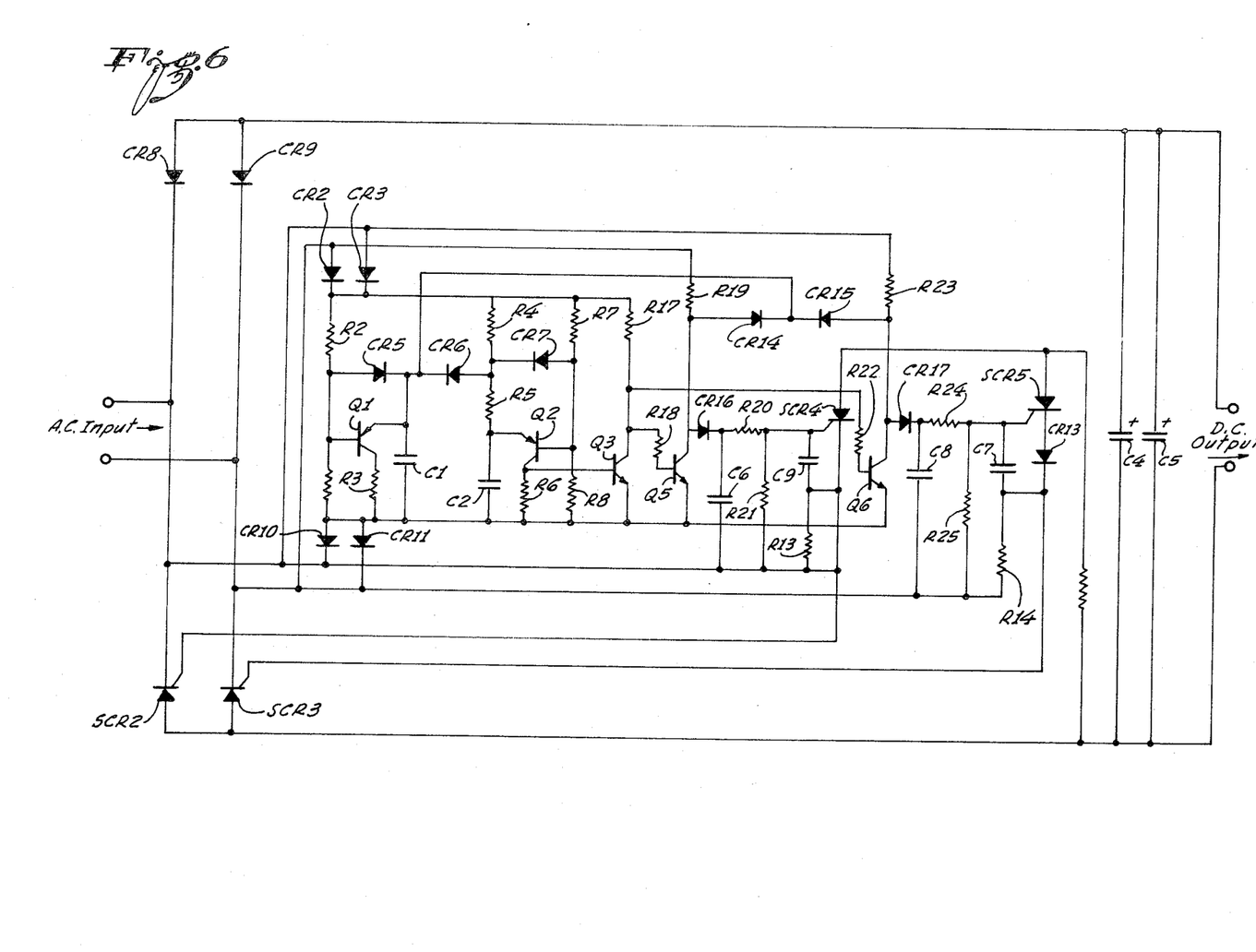
FIG. 6 is a circuit diagram of yet another embodiment in which the resonant effects of the interference filter of FIG. 5 are overcome.

In the circuit of FIG. 6, the components having functions identical to those corresponding components in the circuits of FIGS. 2 and 4 have been given the same reference designations. Although different component values are used, the operation of the circuit of FIG. 6 is the same as that of FIG. 4 except that two pilot silicon controlled rectifiers are used, and each of these has a corresponding network which is provided to extend the duration of its trigger signal.

At the proper time to trigger a silicon controlled rectifier, transistor Q3 is turned on by the phase advance circuit. This action removes base current from the transistors Q5 and Q6 so that they are rendered non-conductive. If, for example, the side of the alternating current input circuit which is connected to resistor 19 is positive, and the side which is connected to resistor 23 is negative, there will be no voltage across resistor 23 and hence no current flow in the resistor. However, there will be a current flow through resistor 19 and that resistor will have a voltage thereacross. The current flow through resistor 19 will charge capacitor C6 rapidly through diode CR16.

As voltage appears across capacitor C6, current will begin to flow in resistor R20, charging capacitor C7. When capacitor C7 has charged to a voltage sufficient to trigger silicon controlled rectifier SCR4, that silicon controlled rectifier will become conductive and supply trigger current to the power silicon controlled rectifier SCR2.

Even though the disturbance of the alternating current input caused by the resonant oscillation following the conduction of the silicon controlled rectifier CR2 may discharge or reset the phase circuit and allow transistor Q5 to become conductive again, the diode CR16 will become reverse biased, and will not discharge the capacitor C6, so that the trigger signal applied to the silicon controlled rectifier SCR4 will remain. Capacitor C6 will gradually discharge through resistors R20 and R21.

The value of resistor R21 is chosen to discharge capacitor C6 completely during the non-conducting half cycle for the silicon controlled rectifiers SCR4 and SCR2, but not so rapidly as to allow capacitor C6 to be discharged in less than the longest anticipated high frequency half cycle. The diode CR14 serves to prevent voltage spikes which occur as a result of the silicon controlled rectifier conduction from damaging the transistor Q4.

The operation of the portion of the circuit of FIG. 6 comprising resistor R23, transistor Q5, diode CR17, capacitor C8, resistor R24, resistor R25, capacitor C9 and silicon controlled rectifier SCR5 is the same as described above in conjunction with the previous circuits, but occurs on the alternate input alternating current half cycle.

The invention provides, therefore, improved circuitry which enables a capacitor input filter to be used in a solid state power supply circuit, and which prevents any excessive inrush of current into the input filter when the power supply circuit is first energized.

While particular embodiments of the invention have been shown and described, modifications may be made. It is intended in the claims to cover the modifications which fall within the spirit and scope of the invention.

What is claimed is:

1. In a circuit for converting alternating current to direct current and which includes a rectifying input circuit for converting an alternating current input voltage into a pulsating direct current voltage composed of a progression of unidirectional half-cycles of said alternating current input voltage, and a filter including capacitor means connected to said input circuit; an inrush current limiting circuit included in said converting circuit including: switching circuit means connected in series between said input circuit and said capacitor means; and a control circuit connected to said input circuit and to said switching circuit means for applying a trigger signal to said switching circuit means to close said switching circuit means momentarily during each half cycle of said pulsating direct current voltage and for varying the timing of said closing from a reset point in each half cycle at which a relatively low voltage is applied to said capacitor means towards a further point in each half cycle at which a relatively high voltage is applied to said capacitor means, the variation of said timing proceeding at a controlled rate as the charge on said capacitor means increases towards a predetermined value.

2. The combination defined in claim 1, in which the half cycles of said pulsating direct current voltage each has a sinusoidal wave form extending from zero degrees to 180°, and in which said control circuit shifts said closing point from substantially 180° towards zero degrees for each successive cycle of said pulsating direct current voltage as the charge on said capacitor means increases towards said predetermined value.

3. The combination defined in claim 1, and which includes resetting circuitry in said control circuit for returning the closing point to said reset point when said capacitor means loses its charge.

4. The combination defined in claim 3, in which said resetting circuitry includes a first capacitor and a second capacitor, and circuitry connected to said first capacitor and to said second capacitor for discharging said first capacitor during each half cycle of said pulsating direct current voltage at a rate determined by the charge on said second capacitor, and circuitry connected to said second capacitor for charging said second capacitor relatively slowly as said capacitor means in the filter is charged and for discharging said second capacitor relatively rapidly as said capacitor means in the filter loses its charge.

5. The combination defined in claim 1, in which said switching circuit means includes a silicon controlled rectifier.

6. The combination defined in claim 1, in which said switching circuit means includes a pair of silicon controlled rectifiers, and said control circuit includes circuitry connected to said silicon controlled rectifiers for triggering said silicon controlled rectifiers alternately for successive half cycles of said pulsating direct current voltage.

7. The combination defined in claim 6, in which said control circuit includes a pilot silicon controlled rectifier connected to said pair of silicon controlled rectifiers for applying a trigger signal to said pair of silicon controlled rectifiers to control the triggering thereof.

8. The combination defined in claim 1, in which said control circuit includes a network for extending the duration of said trigger signal by a predetermined amount.

9. The combination defined in claim 7, in which said control circuit includes first and second pilot silicon controlled rectifiers respectively connected to said silicon controlled rectifiers of said pair for applying respective trigger signals thereto, and said control circuit includes first and second networks connected to respective ones of said pilot silicon controlled rectifiers to extend the duration of each of said trigger signals by a predetermined amount.

* * * * *